Patented Dec. 4, 1951

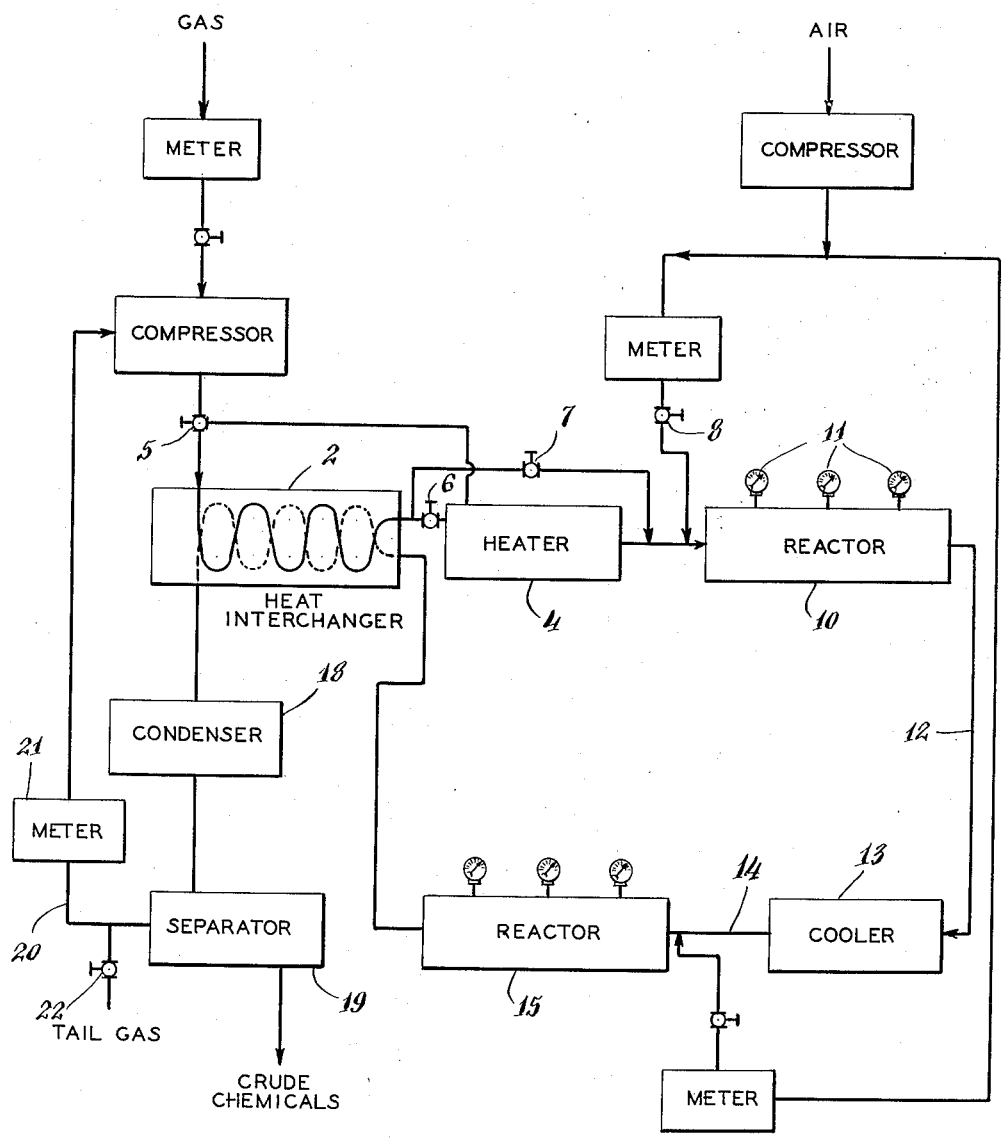

2,577,053

UNITED STATES PATENT OFFICE 2,577,053

METHOD OF OXIDIZING HYDROCARBONS

John C. Walker, Westfield, N. J., assignor to Cities Service Oil Company, Bartlesville, Okla., a corporation of Delaware Application April 30, 1949, Serial No. 90,600

10 Claims. (Cl. 260—451)

This invention relates to the production of oxygenated compounds and more particularly to compounds produced by the controlled oxidation of normally gaseous hydrocarbons.

It is well known that when normally gaseous hydrocarbons are mixed with air or oxygen in amounts insufficient to form an explosive mixture or to cause complete combustion, that partial combustion reactions can be made to take place under proper reaction conditions, with the formation of intermediate hydrocarbon oxidation products such as alcohols, aldehydes, ketones, and acids. Many processes for the production of such products have been disclosed, typical of which are the processes disclosed in U. S. Patents No. 1,960,212; 2,007,115; 2,007,116; 2,042,134; and 2,186,688; to John C. Walker.

These processes in general contemplate mixing air or other source of oxygen with a hydrocarbon gas to be oxidized, under suitable conditions of temperature and pressure, and then separating the normally liquid oxygenated products formed in the reaction from the remainder of the gas. In order to obtain the maximum yield per unit of fresh feed stock, the gas, after separation from the normally liquid products, may be subjected to one or more further reactions, by the addition of a further quantity of available oxygen or a portion of the gas may be recycled to the first reactor where it is mixed with a further portion of fresh feed gas. In all cases, however, the normally liquid products of the reaction are condensed prior to any further treatment of the gas. It is obvious that heat must be supplied to the process after each condensation of liquid products in order to raise the reactants to a temperature at which the available oxygen will react with the hydrocarbons if further oxidation of the gas is desired, and large quantities of cooling water are necessary in order to condense the normally liquid products of the reaction after each stage of oxidation, when the hydrocarbon feed stock is subjected to successive stages of oxidation. It has heretofore been believed that this condensation was necessary in order to prevent degradation of valuable products formed in the reaction to carbon oxides and water in the succeeding stages of oxidation.

I have discovered, however, that if the reaction products are maintained in the gaseous stage and merely cooled sufficiently, prior to further reaction with additional oxygen, to a point such that the addition of the additional oxygen will not raise the reaction temperature above the desired maximum, not only are the reaction products already formed not substantially degraded, but that a higher percentage of the more valuable reaction products, such as acetaldehyde, are formed and may be recovered.

My process may be utilized primarily for the production of valuable oxygenated organic compounds, or it may be utilized as a B. t. u. control measure on natural gases having too high a calorific value for general uses. When operating primarily for chemical production air is the preferred source of available oxygen, but when B. t. u. control is the object, pure oxygen is preferred in order to avoid the introduction of nitrogen into the treated gas.

In general, when operating my process primarily for the production of chemicals, I prefer to use a feed stock containing normally gaseous paraffin hydrocarbons or olefins of $C_2$ and higher, such as the off-gases from a petroleum refinery, ethane-rich natural gas, or normally gaseous hydrocarbons recovered from the absorption towers of a natural gasoline plant. The feed stock is then compressed to a pressure at which the reaction will proceed smoothly, and is heated to a temperature favorable to partial oxidation of the hydrocarbons. Oxygen, or an oxygen-containing gas such as air, is then added in such an amount that the reaction of the oxygen with the hydrocarbons will not raise the ensuing temperature to a point higher than about 1,000° F., and the mixture of gases is passed to a reactor in which the oxygen reacts substantially completely with the hydrocarbons of the feed stock.

The hot gaseous products of the reaction, after having passed through the reactor are then led to a cooler, in which they are cooled to approximately the same temperature at which they entered the first reactor. After passing through the cooler they are mixed with an additional quantity of oxygen or oxygen-supplying gas and are passed to another reactor in which the oxygen reacts substantially completely with the hydrocarbon content of the mixed gases. The latter steps may be repeated until the B. t. u. value of the tail gas has been reduced to the desired value, or it may be continued until the percentage of $C_2$ and higher hydrocarbons in the mixed gases is reduced to a point such that further oxidation is economically impractical. After oxidation to the required degree, the gases are cooled, and the desired products are separated from the unreacted hydrocarbons and gaseous products of the reaction, the gases being either passed to a main for further use as fuel, or utilized as a source of process heat.

Preferably, for reasons which will be hereinafter set forth, a portion of the gases exiting from the condenser may be recycled to the initial preheat chamber where they are mixed with fresh quantities of feed stock.

A specific example of one method of carrying out the process according to the plan illustrated by the accompanying flow sheet will now be described. The gas to be treated, for the purposes of this illustration considered as a natural gas of relatively high calorific value such as an ethane-rich natural gas, is drawn from a gas main and passed through a meter to determine the rate of flow and volume of gas to be treated. From the meter the gas may be passed through a compressor to place it under suitable superatmospheric pressure. The gas leaving the compressor is then passed to a heating zone in which the temperature is raised to a value favoring the partial oxidation of the hydrocarbon content of the gas. This temperature will, of course, vary with the pressures employed, but under preferred conditions will normally approximate about 650° to about 750° F. As illustrated in the drawings, the incoming gases are heated in exchanger 2 by interchange with the high temperature gases emerging from the last of the reactors of the system. However, in order to maintain the temperature of the preheat at a highly accurate value, the gases may be heated as by an externally fired heater 4, or a combination of heat interchanger and externally heated heater may be used, suitable control valves 5, 6, and 7 being provided for directing the flow of gases in the preferred channel.

Air or other oxygen-supplying gas may be mixed with the gas to be treated prior to the preheating step but is preferably passed through a compressor, meter, and control valve 8, and added to the feed stream immediately prior to entry of the gases into a reactor 10, which is equipped with thermocouples 11 for observing the location of maximum temperatures of reaction. The amount of air or oxygen admitted to the system is so regulated that the resulting exothermic reaction of the free oxygen with the hydrocarbons present will not raise the temperature of the gases within the reactor 10 to a point above 1,000° F., and preferably to a temperature of from about 825° F. to about 900° F., since at higher temperatures the reaction tends to go to carbon oxides and water rather than to the desired oxygenated chemicals. Obviously, the amount of air or oxygen introduced into the system at this point will vary with the temperature of the preheat of the entering gases, and will also vary according to the presence or absence of inert gases in the feed stock. Under preferred operating conditions, the volume of air admitted to the reactor should contain from about 1 vol. per cent to about 20 vol. per cent of available oxygen, based on the reactive hydrocarbons present in the feed stock, although when very large quantities of inert gases are present, the oxygen percentage may be considerably higher. For example, when the feed stock to a reactor contains about 2½ per cent reactive hydrocarbons of $C_2$ and higher, as much as 20 per cent of available oxygen based on reactive hydrocarbons may safely be used, but when the feed stock contains about 8 per cent reactive hydrocarbons, only about 7 per cent available oxygen based on reactive hydrocarbons may be added.

From the reactor 10 the gases are led through line 12 to cooler 13 in which they are cooled to the desired preheat temperature of from about 650–750° F. From the cooler 13 the gases are passed to reactor 15 after having been admixed with additional air or oxygen in such an amount that the reaction temperature within the reactor 15 will not rise above 1,000° F. and will preferably be from about 825° F. to about 900° F. From the reactor 15 the gases may be led to heat exchanger 3, or they may be passed to another exchanger, not shown in the drawing, in which they give up heat to other process streams, or in which they may be utilized as a source of heat for process steam. After passing through the exchanger, the gases are led to a condenser 18 and thence to a separator 19 in which the crude liquid chemicals are separated from the unreacted hydrocarbons and gaseous products of the reaction.

The gaseous products of the reaction may be vented to a main or other point of disposal, or a portion may be returned to the system through line 20 and meter 21, a bleed valve 22 being provided to regulate the amount of tail gas vented. I have found it desirable to limit the number of stages of reactions and to recycle a portion of the gaseous products because I find that the presence of quantities of more or less inert gases in the system gives a better control of temperature in the reactors, prevents local overheating which tends to break down the valuable products of the reaction into water and carbon oxides, and permits the use of more oxygen in each reaction stage, thus increasing the yield of desired chemicals per reaction. The term "inert gas" as used in this specification, is intended to include not only gases such as nitrogen and steam, which are nonreactive under the conditions of this process, but also gases which are reactive only to a very minor extent, such as methane.

It has been found that pressure plays an important part in determining the character of the liquid intermediate oxidation products formed during the partial oxidation reactions. It is my experience, for example, that pressures of at least 100 p. s. i. g. are necessary, under other reaction conditions within the limits herein referred to, in order to obtain satisfactory yields of alcohol-aldehyde oxidation products. From a minimum of about 100 p. s. i. g., the alcohol-aldehyde yield in general increases with an increase in the pressure. Relatively large yields of methanol and aldehyde products have been obtained by the operation of the present process at pressures ranging up to 300 p. s. i. g. Above these pressures the reaction will tend to go to alcohols rather than to aldehydes, and since the aldehyde products are in general more valuable than the alcohols produced, it is preferred to operate the process at pressures under 300 p. s. i. g., although pressures as high as 1,000 p. s. i. g and over may be used if alcohols are the products desired. The most economic pressure to be used may, however, be dictated by factors other than the class of products desired. For example, if my process is to be applied to B. t. u. control of a feed stock of ethane-rich natural gas coming from the well at high pressures, and it is desired to deliver the tail gas to the main at the same pressure, it is obviously more economic to treat the gas at such pressures rather than to bring the gas down to a relatively low pressure for treatment, and then recompress the gas for delivery to the main.

A careful and accurate control of preheat and reaction temperatures is another important factor in the production of oxygenated products. For the best yields, prior to entering each reactor, the gas should be brought to within 100 to 200° F. of the desired reaction temperature, which in general should range from about 825° F. to about 900° F. The difference between the preheat and reaction temperature is, of course, a function of the amount of available oxygen added to the fed, and of the amount of inert gases present in the feed to the reactor. Reaction of hydrocarbons with the available oxygen supplied will release heat, which will raise the temperature of the mixed gases, the temperature rise, per unit of oxygen added, varying inversely with the total weight of the mixed gases. It will thus be apparent, that if the mixed gases contain appreciable quantities of inert gases, more oxygen can be added at each step of the process per unit of reactive hydrocarbon contained in the mixed gases, and a higher proportion of the feed stock may be converted to valuable chemicals per pass through each reactor. In addition, the presence of an inert diluent tends to minimize the presence of local hot spots in the reactor, with consequent cracking and loss of chemicals.

A readily available source of such an inert diluent is found in the tail gas from my process, when recycled to the process. In those cases in which air is used as a source of oxygen, the inert gas will be nitrogen, together with whatever methane is found in the tail gas; whereas in the case in which pure oxygen is used, and the feed stock is ethane-rich natural gas, the inert gas will be largely methane. Steam may also be introduced into the system as an inert diluent. In addition to supplying inert gas to the system, recycling of a portion of the tail gas will return to the process a part of the hydrocarbons capable of being oxidized which escaped reaction during the process, thus increasing the yields per unit of fresh feed stock supplied to the process.

While my process may be operated using fresh feed stock alone, the mixed gases entering the first reactor may contain up to 99 per cent or more recycle gas. Use of very large percentages of recycle gas are generally not economical, however, due to the greatly increased size of a plant designed to handle such large amounts of recycle, per unit of crude chemicals produced. Generally, for maximum yields per unit of fresh feed gas, and with moderate investment per unit of crude produced per day, I prefer to employ from about two per cent to about 20 per cent fresh feed gas in the mixed gases entering the first reactor.

While the process as described in connection with the drawing is limited to the use of but two reactors in series, additional reactors may be used if desired. The number of reactors, will, of course, be determined by the economics of the process, and the optimum number will depend in large part upon the nature of the feed stock, and the purpose for which the process is to be used, that is, whether the process is operated primarily to produce chemicals, or as a B. t. u. control process.

I have found that when operating in accordance with my herein described process, I can obtain yields of 50 per cent or more of total chemicals over the yields obtainable from conventional processes per unit of feed stock, when using comparable recycle ratios. Increases in yields of more valuable chemicals are even higher, the acetaldehyde yield from my process being over two and one half times the yield from a conventional plant operated under the same conditions.

Having now described my process, what is claimed is:

1. The process for producing oxygenated hydrocarbon compounds from normally gaseous hydrocarbon fractions including passing a feed stock comprising normally gaseous hydrocarbon fractions above methane, under superatmospheric pressures through a plurality of reactors arranged in series, admixing an oxygen-supplying gas with the feed stock prior to its entrance into each reactor heating the gases entering the first reactor to a temperature favoring partial oxidation of their hydrocarbon content, removing heat generated in each reaction stage except the last from the gaseous stream while maintaining the temperature of the gases at a value favoring partial oxidation of the said hydrocarbon fraction until the gases have passed through all the reactors, and condensing and separating normally liquid reaction products from the effluent gases from the last reactor.

2. The process according to claim 1 in which the quantity of oxygen added to the feed stock prior to entry into each reactor is in an amount such that the exothermic reaction of the oxygen with the hydrocarbon content of the feed stock will not raise the temperature of the mixed gases within each reactor over about 1,000° F.

3. The process according to claim 1 in which the reactions are carried out at pressures in excess of about 100 p. s. i. g.

4. The process according to claim 1 in which the temperature of the gases entering each reactor is maintained at about 650° F. to about 750° F.

5. The process for producing oxygenated hydrocarbon compounds from normally gaseous hydrocarbon fractions, including heating a feed stock comprising normally gaseous hydrocarbon fractions above methane under a pressure above about 100 p. s. i. g. to a temperature of about 650° F. to 750° F., passing the feed stock through a plurality of reactors arranged in series, admixing an oxygen-supplying gas with the feed stock prior to its entrance into each reactor, the amount of free oxygen admixed being such that the exothermic reaction of the oxygen with the hydrocarbon content of the feed stock will not raise the temperature of the mixed gases within each reactor to a value above 1,000° F., cooling the effluent gases from each reactor except the last to about 650° F. to 750° F., and separating the desired products of reaction from the effluent gases from the last reactor.

6. The process according to claim 5 in which the feed stock is compressed to from about 100 to about 300 p. s. i. g.

7. The process according to claim 5 in which oxygen is added prior to each reaction in such an amount that the temperature in each reactor will rise to from about 825° F. to about 900° F.

8. The process according to claim 5 in which the oxygen-supplying gas is air.

9. The process according to claim 5 in which a portion of the gases separated from the normally liquid reaction products forms a portion of the feed stock to the first reactior of the series.

10. The process according to claim 9 in which the feed stock to the first reactor consists of from about 98 per cent to about 80 percent of gases separated from the normally liquid reaction products, and from about 2 per cent to about 20 per cent of untreated stock comprising normally gaseous hydrocarbons of molecular weight greater than methane.

JOHN C. WALKER.

REFERENCES CITED

The following references are of record in the file of this patent:

UNITED STATES PATENTS

| Number | Name | Date |
|---|---|---|
| 2,042,134 | Walker | May 26, 1936 |
| 2,128,909 | Bludworth | Sept. 6, 1938 |
| 2,186,688 | Walker | Jan. 9, 1940 |
| 2,288,769 | Alleman et al. | July 7, 1942 |